March 27, 1945. W. E. GRIFFITHS 2,372,321
PROCEDURE AND APPARATUS FOR SEPARATING STAINLESS STEEL
PARTICLES FROM PARTICLES OF ABRASIVE MATERIAL
Filed Sept. 10, 1942
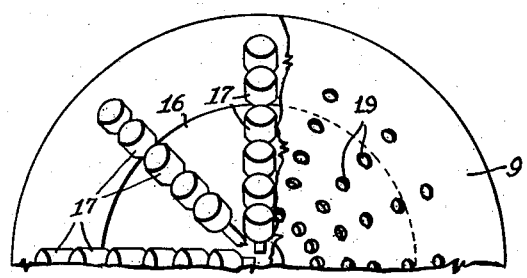
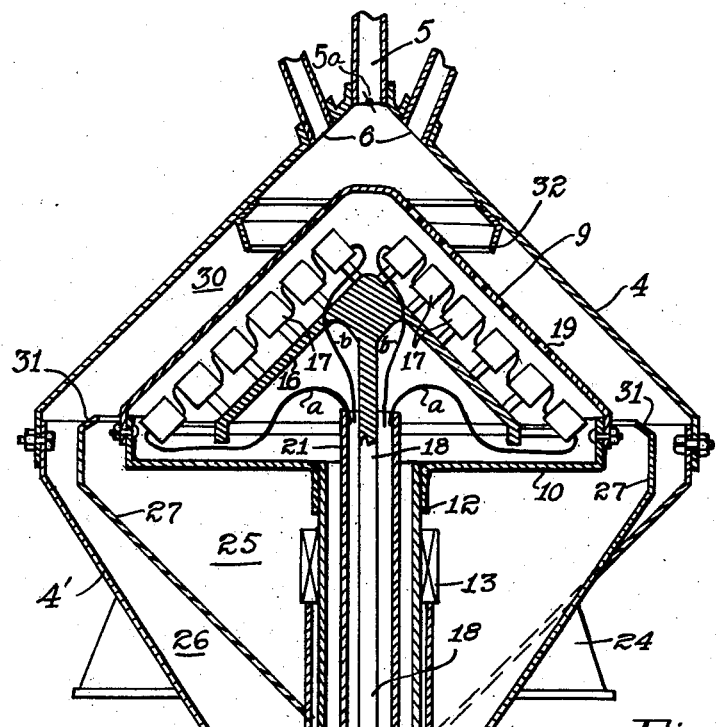
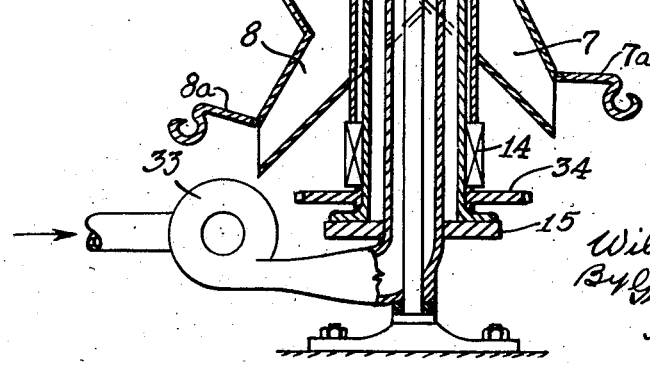
INVENTOR
William E. Griffiths
By Green & McCallister
His Attorneys Patented Mar. 27, 1945

2,372,321

UNITED STATES PATENT OFFICE 2,372,321

PROCEDURE AND APPARATUS FOR SEPARATING STAINLESS STEEL PARTICLES FROM PARTICLES OF ABRASIVE MATERIAL

William Ewart Griffiths, Pittsburgh, Pa., assignor to Allegheny Ludlum Steel Corporation, a corporation of Pennsylvania Application September 10, 1942, Serial No. 457,824

13 Claims. (Cl. 209—8)

The fabrication of stainless steel into articles of commerce usually necessitates some machining and grinding of the steel, with the result that the discarded particles of stainless steel become mixed with particles of abrasive material. Such mixtures have heretofore been considered waste material, and even though the alloy steel particles contained therein are quite valuable and, under the present emergency conditions, have great strategic value. One of the reasons for this is that the most valuable findings are those composed of austenitic chromium-nickel steel. These particles are non-magnetic and, inasmuch as the particles of abrasive material are also non-magnetic, no procedure has heretofore been available for ensuring a separation of the more valuable stainless steel particles from the abrasive particles.

One of the objects of my invention is to produce procedure and apparatus for accomplishing a satisfactory separation of the small and ground particles of stainless steel from the particles of abrasive material employed in the grinding operation.

The procedure constituting my invention involves utilization of the fact that while commercial stainless steels are generally considered non-magnetic, the magnetic characteristic of each of the various stainless steels varies with the amount of austenitic forming metals—such as nickel and manganese—included as an alloying constituent of the steel. I also take advantage of the fact that the oxide of even the least magnetic stainless steel has a marked magnetic characteristic.

While the cold working of stainless steel—such for example as the grinding of such steel—increases the magnetic characteristic of the particles of stainless steel removed from the mass of that metal during cold working operation, the heat generated during the particle removing operation also tends to produce a magnetic oxide coating on each particle so removed. In carrying out my procedure I, however, subject the mixed mass of stainless steel particles and abrasive material particles to a heat treatment for the double purpose of producing an oxide coating on each particle of stainless steel in the mass, and also for the purpose of removing undesirable free carbon from the mass. As a part of my improved separating procedure I, therefore, heat the mass of particles to be separated to an oxidizing temperature while they are retained in an oxidizing atmosphere. That is to say, I heat the particles, while they are open to the air, to a temperature such, for example, as 1900° F. and thus produce an oxide coating on each particle of stainless steel.

This coating has a marked magnetic characteristic. Its volume is relatively large as compared to the particle, with the result that independently of the magnetic characteristic of the stainless steel constituting the nucleus of the particle, the coating imparts a magnetic characteristic to the particle.

In carrying out the further steps of the procedure I preferably subject the mass of particles to the combined action of centrifugal force, air flotation and a magnetic field, under conditions such that the effect of the magnetic field opposes that of both the centrifugal force and the air flotation. I also prefer to progressively increase the effect of the magnetic field while progressively increasing the centrifugal force acting on each particle within the mass.

From the foregoing it will be apparent that as a preliminary to the mechanical separation of the various particles of the mass into two or more groups I treat the mass so as to render the stainless steel particles magnetic. That is, as a preliminary to the mechanical separation of the particles of a mass I treat the mass so as to ensure that it is made up of but two types of particles, viz., magnetic and non-magnetic particles. This does not mean that all the magnetic particles are alike in their response to a magnetic field. As a matter of fact I may, and preferably will, carry the mechanical separation forward in such a way as to not only separate the non-magnetic particles from the magnetic particles, but also to grade the magnetic particles in accordance with the degree of their response to a magnetic field.

In accomplishing the mechanical separation I preferably employ a mechanical separator so arranged that the mass of particles delivered to it is simultaneously subjected to the action of centrifugal force, air flotation and magnetic fields of varying intensity.

In the drawing accompanying and forming a part hereof, Figure 1 is a diagrammatic vertical sectional view of a mechanical separator embodying my invention. Figure 2 is a fragmental plan view of the separator shown in Figure 1, with the cover removed and a part of the rotor broken away for the purpose of illustrating the arrangement of electro-magnets which constitute a part of the separator.

The view of Figure 1 is taken along the vertical axis of the machine there illustrated. As illustrated, the separator includes a stationary casing 4 which is shown provided with an inlet port 5, two vent ports 6 and two delivery ports 7 and 8. The casing encloses a rotor which is generally cone shaped and which includes a conical plate 9 which, together with a base plate 10, is carried by a vertical, rotatable hollow shaft 12. The shaft is hollow and is suitably mounted for rotation in bearings 13 and 14, and is provided with a suitable step bearing 15, which may be raised and lowered to adjust the position of the rotor. All the parts are diagrammatically illustrated.

The plates 9 and 10 are preferably non-magnetic and enclose a stationary frame 16 on which electro-magnets 17 are mounted. The frame 16 is mounted on a central column 18 which extends upwardly through the hollow shaft 12. As shown, the conical plate 9 is provided with perforations 19 and air under pressure is delivered to the chamber, enclosed by it and the base plate 10, through a vertical shaft 12 which extends upwardly to the pipe 12 and surrounds the central column 18.

As shown in Figure 2, the electro-magnets 17 are so located on the stationary frame 16 that they are, in effect, arranged in a plurality of series which converge at a point adjacent to the apex of the conical plate 9. The pole faces of these magnets are preferably so arranged that they define a substantially conical plane which extends substantially parallel to the conical plate 9. Either the frame-supporting column 18 or the vertical shaft 12 is so mounted as to provide for relative movements between the electro-magnets 17 and the plate 9 which will vary the distance between the pole faces of the magnets and that plate. I, however, prefer to accomplish this by raising or lowering the step bearing 15.

In the drawing I have diagrammatically illustrated terminal wires $a$ and $b$ which constitute the electric connections of the magnets 17 and which may be and preferably are lead up through the stationary air delivery pipe 21. The usual electrical control apparatus is contemplated for varying the magnetic intensity of the various magnets 17 although such apparatus is not shown.

The frame 4 may be mounted on any suitable support and I have diagrammatically illustrated the base portion 4' thereof provided with supporting legs or brackets 24.

The interior of the base portion is shown divided into two chambers 25 and 26 by means of a conical or chute-like partition 27. The chamber 25 terminates in the chute-like delivery port 7, and the chamber 26 terminates in the similarly arranged port 8. The rotor is so located with relation to the cover portion of the casing 4 as to provide a conical passage 30 between it and the plate 9. The upper end of the partition 27 terminates near the lower edge of the plate 9, dividing the passage 30 into two parts, one of which communicates directly with the chamber 25 and the other of which communicates directly with the chamber 26. The partition is shown as provided with a re-entrant or inwardly turned angle 31 at its upper edge which is so located with relation to the lower portion of the plate 9 that it constitutes a guard for the portion of the passage 30 opening into the chamber 25, and material traversing the passage 30 and striking the flange 31, is therefore, deflected into the chamber 26.

An annular baffle 32 is mounted on the cover of the casing 4 and projects partially across the passage 30 at a point adjacent the apex of the conical plate 9. This baffle has the double function of directing such material as is thrown off of the plate 9 by centrifugal force back onto the plate, and also of creating eddy currents in the passage 30, with the intent of preventing the heavier particles from passing upwardly with the air currents and out through one or the other of the ports 6.

In Figure 1 I have diagrammatically illustrated a blower 33 communicating with the lower end of the pipe 21 and delivering air through that pipe to the enclosure within which the electro-magnets 17 are located. A gear 34 shown as mounted on the shaft 12 adjacent to the step bearing 15, is illustrated as the rotating or driving means for the shaft 12. Any conventional mechanism such as an electric motor (not shown) may constitute the driving means for the gear 34.

The operation of the apparatus is as follows: The electro-magnets 17 are energized. The shaft 12 and, consequently, the conical plate 9 are rotated at the desired speed. Air under pressure is delivered to the enclosure formed by the plates 9 and 10 and is discharged more or less radially by the apertures 19 formed in the rotating plate 9. This discharge is into the passage 30 and creates an upward flow of air through that passage and toward the air outlet port 6. For the purpose of ensuring such an air flow the ports 5, 7 and 8 may be provided with closures which are adapted to be opened periodically for the passage of material and which, therefore, constitute air valves when closed.

In Figure 1 I have shown a valve 5a located in the material delivery passage 5. The valve may be employed for closing or so controlling that passage as to avoid the escape of air therethrough while air is being delivered through the rotor ports 19 into the passage 30. I have likewise diagrammatically illustrated hinged closure for the ports 7 and 8. The closure for the port 7 is designated by the reference character 7a and the closure for the port 8 is designated by the reference character 8a.

The discharge of air through the ports 7 and 8 can also be prevented by applying suction to the blast delivery ports 6 and in this way so controlling the pressure within the casing 4 as to prevent an air flow from the apertures 19 downwardly into the compartments 25 and 26.

Material to be separated is delivered onto the apex of the rotating plate 9 through piping which communicates with the port 5. The material so delivered is spread radially by the combined action of its impact on the plate 9 and centrifugal force. This spreading action is controlled somewhat by the baffle 32 which not only stops the radial movement of material striking it but also checks the whirling movement of that material. As a result, such material falls back onto the rotating plate and is again subjected to such centrifugal action as is occasioned by the rotation of the plate. It will also be apparent that the material is simultaneously subjected to the force of gravity, the lifting force occasioned by the movement of air under pressure through the apertures 19 and up through the passage 30, and to the magnetic force of the energized magnets 17.

The centrifugal force, the lifting force of the air currents traversing the passage 30 and the magnetic force can all be controlled in the operation of adjusting the apparatus to effectively separate magnetic particles from non-magnetic particles delivered onto the rotating plate 9. In addition, the position of the rotor may be adjusted by raising or lowering the step bearing 15 and thereby changing the relationship between the material-supporting surface of the rotating plate 9 and each of the following, viz., the edge of the re-entrant flange 31, the internal face of the cover of the casing 4 and the pole pieces of the magnets 17.

During the operation of the apparatus the more magnetic particles will tend to move through the passage 30 on or adjacent the plate 9 and will therefore be delivered into the compartment 25 of the casing. The non-magnetic particles will be unaffected by the magnetic field or fields through which they pass during their progress along the passage 30 and will, therefore, respond more readily to centrifugal force, with the result that, except for the lighter of these particles, they will tend to enter the compartment 26 of the casing. The lighter particles will be discharged with the air blast through the ports 6.

It should be noted that the electro-magnets 17 are so arranged that particles traversing downwardly along the passage 30 are subjected to magnetic fields which preferably progressively increase in intensity, with the result that magnetic particles are forcibly drawn toward the plate 9 as they approach the lower end of the passage 30 or as they approach the partition 31. It should also be noted that the magnets are located in spaced relationship circumferentially of the plate, with the result that particles moving with the rapidly rotating plate, or in a spiral path through the passage 30, are moved into and out of a magnetic field. This tends to cause the magnetic particles to vibrate in such a way as to contribute to the passage of material along the passage 30, and the separation of the magnetic particles from the non-magnetic particles.

As previously pointed out, the magnetism of the various commercial stainless steels varies. This variation may be quite marked. It may make it desirable to subject a mass of material, such as the grindings, filings, cuttings, etc., of various stainless steels, to a grading treatment by means of apparatus such as is here illustrated and described. For example, a mass of such material collected in the chamber 26 on its first passage through the separator is preferably passed through the machine a second time for the purpose of separating the less magnetic steel particles from the particles of abrasive material. The adjustments capable of being made during the operation of the separator here described, make it possible to employ that separator not only to separate the abrasive material from the mass of steel grindings, trimmings, etc., but also to grade the metal particles with relation to their magnetic characteristics.

Where the mass of particles to be subjected to the separating action includes grindings or small particles of straight chromium steels (which are magnetic) and also particles of austenitic chromium-nickel steels (which are non-magnetic), a change in the procedure may be made for the purpose of separating the straight chromium particles from the austenitic and abrasive particles and then separating the abrasive particles from the austenitic particles. In order to accomplish this the step of heating under conditions such as to form a magnetic coating on the stainless steel particles, will be deferred until after the straight chromium steel particles have been separated out of the mass. This will be accomplished as previously described in connection with the operation of the separator, and the material received by the receptacle 25 (straight chromium steel particles) will be retained while the remainder of the mass (particles received by the receptacle 26) will be heated to a temperature of about 1800 or 1900° F. and under conditions such as to produce a magnetic coating on each of the austenitic particles. After this treatment the mass of austenitic particles and abrasive particles will be again passed through the separator with the result that the particles having the magnetic oxide coating will be separated from the abrasive non-magnetic particles.

It will be apparent to those skilled in the art that other changes in the procedural steps here outlined may be resorted to, and that various changes may be made in the apparatus illustrated, without departing from the spirit and scope of my invention as defined by the appended claims.

What I claim is:

1. A method of separating particles of abrasive material from particles of stainless steel which consists in heating a mixture of such particles to an oxidizing temperature in an oxidizing atmosphere and forming a magnetic coating on the stainless steel particles of such mixture, subjecting the mixture to the action of centrifugal force and causing it to move in response thereto while opposing the effect of such force on said coated particles by a magnetic field.

2. A method of grading particles of stainless steel such as grindings, filings, cuttings or trimmings into groups of varying magnetism, which consists in heating such particles to an oxidizing temperature in an oxidizing atmosphere, then subjecting the particles so treated to a magnetic field while causing them to move in response to a force opposing the action of such field on such particles so coated and in separating such particles into groups while so moving and while subjected to the influence of a magnetic field.

3. A separator comprising a casing, a cone shaped rotor within the casing with its apex uppermost and so located with relation to the casing as to form a cone shaped passage between it and the casing, stationary electro-magnets located within the rotor and arranged in rows diverging from the apex of the rotor, means for delivering particles to be separated into said passage and onto the apex of said rotor, means for rotating the rotor about an axis extending to the apex thereof and means for delivering a flow of fluid under pressure through the rotor past said electro-magnets and through apertures formed in the conical surface of the rotor and into said passage.

4. A separator comprising a casing, a conical rotor within the casing, a plurality of electro-magnets located within the rotor and arranged in rows which diverge from the apex of said rotor, means for rotating the rotor about the conical axis thereof, means for delivering particles to be separated onto the apex of said rotor, and means for creating a flow of air upwardly through and across the conical face of the rotor.

5. A method of separating non-metallic particles from austenitic steel particles which consists in heating a mixture of such particles to an oxidizing temperature in an oxidizing atmosphere and in thereby producing a magnetic coating on such steel particles of such mixture, then causing the mixture to move in stream-like form while being subjected to centrifugal force and while the effect of such force on such particles is simultaneously reinforced by the lifting force of a fluid flow and opposed by gravity and a magnetic field, and accomplishing a separation of the coated particles from the non-metallic particles while all such particles are moving.

6. A method of separating non-metallic particles from austenitic stainless steel particles which consists in heating a mixture of such particles to an oxidizing temperature in an oxidizing atmosphere and in thereby producing a magnetic coating on the steel particles of such mixture, then causing the mixture to move in stream-like form under the influence of centrifugal force while the effect of such force on the steel particles of such mixture is opposed by a magnetic field of increasing intensity along the path of movement of such mixture, and in accomplishing a separation of said steel particles from said non-metallic particles while such particles are so moving.

7. A method of separating austenitic stainless steel particles from particles of abrasive material which consists in heating a mixture of such particles under conditions such as to form an oxide coating on the stainless steel particles of the mixture, then causing such mixture to move in a stream-like formation in response to progressively increasing centrifugal force while simultaneously opposing the effect of such force on such coated particles by the action of gravity and a magnetic field of progressively increasing intensity and in separating coated particles from the particles of abrasive material while all such particles are moving in response to centrifugal force and are subjected to the influence of such magnetic field.

8. A method of separating magnetic particles from a mixture of such particles and non-metallic particles which consists in causing such mixture to move in a stream-like form in response to centrifugal force while simultaneously supplementing the effect of such force on such particles by a fluid flow and simultaneously opposing the effect of such force on the magnetic particles of such mixture by the influence of a magnetic field of increasing intensity along the path of such flow, and in separating the magnetic particles from the non-metallic particles of such mixture while such particles are moving in response to such force and are subjected to the influence of such magnetic field.

9. A separator comprising a casing, a cone-shaped rotor within said casing with the apex thereof uppermost, a series of electro-magnets located within said rotor and extending along and circumferentially around the conical face thereof, means for delivering particles to be separated into said casing and onto the apex and the conical face of said rotor, means for rotating the rotor about an axis extending through its apex and means for delivering a flow of fluid into said casing through apertures formed in the conical face of said rotor.

10. A separator comprising a casing having a portion thereof in the form of a cone and provided with an inlet port at the apex thereof for the delivery into the casing of materials to be separated, a substantially conical rotor located within said casing with its apex uppermost and so as to provide a conical passage between the conical face thereof and the conical face of said casing, a plurality of magnets located within said rotor and extending along and circumferentially around the conical face thereof, a partition projecting within said passage and extending circumferentially around the lower portion of said rotor in spaced relationship therewith and with said casing, means for rotating said rotor about an axis extending through the apex thereof and means for delivering a fluid flow through apertures formed on the conical face of said rotor and into said passage.

11. A method of treating a mass of particles containing chromium steel particles, austenitic steel particles and non-metallic abrasive particles which consists in subjecting such mass to a separating action under the influence of a magnetic field and thereby removing magnetic particles from such mass, then heating the remainder of the mass in an oxidizing atmosphere to a temperature of about 1900° F. and again subjecting the mass to a separating action under the influence of a magnetic field.

12. A method of separating austenitic steel particles from a mass containing magnetic steel particles and non-metallic abrasive particles, which consists in causing such mass to move in stream-like form while being subjected to centrifugal force and while the effect of such force on particles of the mass is simultaneously opposed by a magnetic field to thereby accomplish a removal of the magnetic particles from the said mass during such motion, then heating the remainder of the mass to an oxidizing temperature in an oxidzing atmosphere to thereby produce a magnetic coating on the austenitic steel particles of the mass and again causing the mass to move in stream-like form while being subjected to centrifugal force and while the effect of such force on the coated particles of the mass is simultaneously opposed by a magnetic field to thereby accomplish a separation of the coated particles from the non-metallic particles of such mass during such motion.

13. A method of separating non-metallic, magnetic and austenitic steel particles from a mass containing a mixture of all such particles, which consists in causing such mass to move in stream-like form in response to centrifugal force while reinforcing the effect of such force on particles of such mass by a fluid flow across the path of such movement and simultaneously opposing the effect of such fluid flow and said centrifugal force on the magnetic particles of the mass by the action of a magnetic field of increasing intensity along the path of such movement to remove the magnetic particles from the mass, then heating the mass to an oxidizing temperature of approximately 1900° F. in an oxidizing atmosphere and thereby producing a magnetic coating on the austenitic steel particles of the mass and again causing the mass to move in stream-like form in response to centrifugal force while reinforcinng the effect of such force on particles of the mass by a fluid flow across the path of such movement and simultaneously opposing the effect of such fluid flow and said centrifugal force on the coated particles of such mass by the action of a magnetic field of increasing intensity along the path of such movement.

WILLIAM EWART GRIFFITHS.

CERTIFICATE OF CORRECTION.

Patent No. 2,372,321. March 27, 1945.

WILLIAM EWART GRIFFITHS.

It is hereby certified that error appears in the printed specification of the above numbered patent requiring correction as follows: Page 2, first column, line 19, for "shaft 12" read --pipe 21--; line 20, for "pipe" read --shaft--; and that the said Letters Patent should be read with this correction therein that the same may conform to the record of the case in the Patent Office.

Signed and sealed this 12th day of June, A. D. 1945.

Leslie Frazer (Seal)   Acting Commissioner of Patents.